Nov. 4, 1952  D. J. McLAUGHLIN  2,616,572
CASING STICK HOLDER
Filed Aug. 30, 1949

INVENTOR.
Daniel J. McLaughlin
BY
Roy G. Story
ATTORNEY

Patented Nov. 4, 1952

2,616,572

UNITED STATES PATENT OFFICE 2,616,572

CASING STICK HOLDER

Daniel Joseph McLaughlin, Cleveland, Ohio, assignor to Swift & Company, Chicago, Ill., a corporation of Illinois Application August 30, 1949, Serial No. 113,105

6 Claims. (Cl. 214—1)

The present invention relates to a method and apparatus to facilitate placing newly formed linked sausages, or the like, on the smoke sticks upon which the sausages are supported while being smoked.

In the preparing of linked sausages, frankfurters, or the like, the procedure generally followed is to stuff the casing with a fluid mixture of raw comminuted material and then to twist the stuffed casing at spaced points to form a series of raw, linked sausages. Subsequently, the length of linked sausages is coiled or draped over a "smoke stick" which is then supported upon the "sausage tree," a frame for holding the sticks in the smoke room.

Numerous expedients have been tried to speed the handling of the lengths of links between the time they are formed and are hung on the "sausage tree" but, generally speaking, the use of smoke sticks and the hanging of the sausages over them have been retained.

While the coiling of the sausage strings about the stick is preferable because a greater length can be accommodated than when the strings are draped, it is difficult to do, particularly with natural casings where the "links" between the individual sausages tend to come untwisted, making it necessary to reform the sausages. As a result, the general practice is to drape the sausages over the stick rather than coiling them about it.

The principal object of the present invention is to permit sausage strings to be coiled by hand about a smoke stick and to allow this to be done with ease and dispatch. To achieve this object I have devised a novel method and apparatus wherein the sausages are first hung over a holder from which they are readily transferred to a smoke stick.

Other objects and advantages include the following: the low initial cost of a loading device; the labor saving that is achieved by using the device; the fact that the device may be readily modified for use with any type of smoke stick; the lack of any moving parts to cause wear, among other difficulties; the cleanliness that may be attained not only because of the lack of moving parts, but because of the simplicity; and the fact that the device may be mounted at any suitable work surface in present plants.

Additional objects and advantages will become apparent from the following description taken in conjunction with the drawings, in which.

The following description is for the purposes of compliance with section 4888 of the Revised Statutes and should not be construed as imposing unnecessary limitations on the appended claims.

Figure 1:
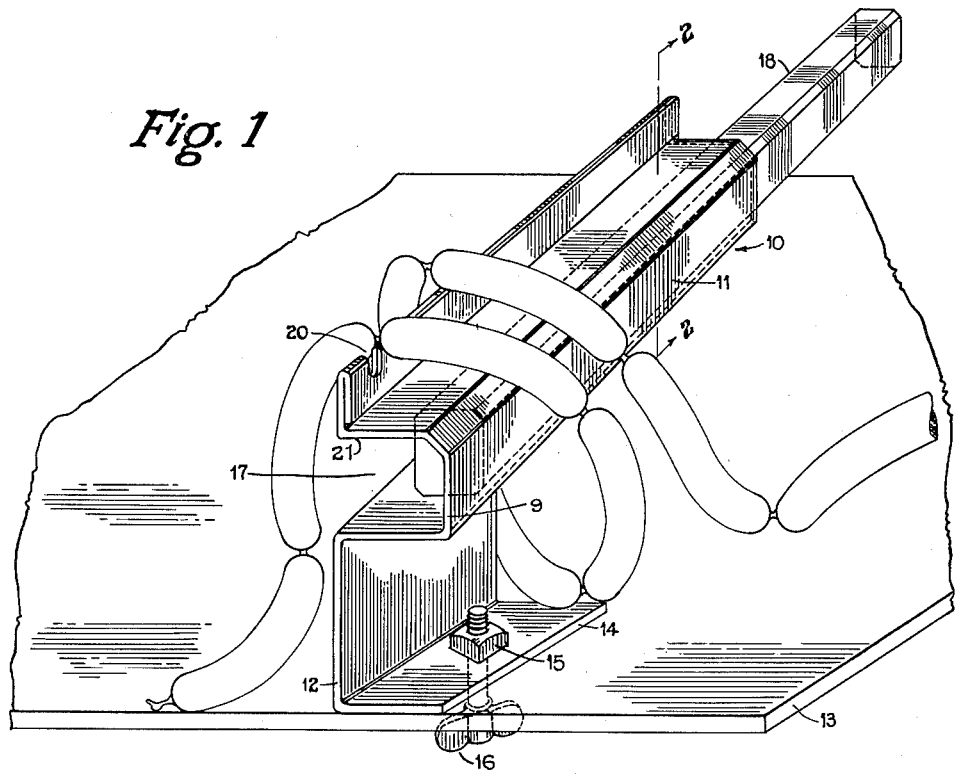
Fig. 1 is a perspective view of an embodiment of the present invention.
Figure 2:
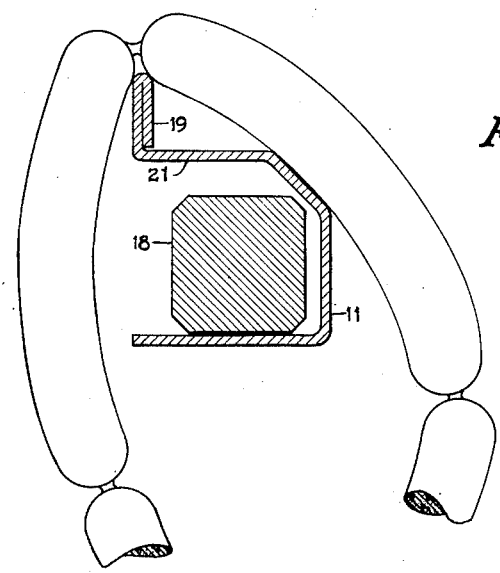
Fig. 2 is a section taken at line 2—2 of Fig. 1.

The loading device, generally 10, comprises a U-shaped holder 11 and a stand or supporting means 12 affixed to holder 11 adjacent one end 9 thereof as indicated in Fig. 1. If the stand 12 is to be affixed to a suitable work surface, such as table top 13, a foot 14 on the bottom of the stand 12 may have a threaded nut 15 affixed thereto to cooperate with a wing bolt 16 to clamp the foot 14 to the table top 13.

The internal opening 17 of the U holder 1 is formed sufficiently large to receive the smoke sticks 18. The holder 11 has an upstanding flange 19 projecting from a side 21 of the open end of the U opening 17 of the holder 11 to act as a guide for the connecting links between the sausages, both in forming the size of loops about the device and in sliding the sausages to the rear of the device to facilitate the adding of additional loops. At the rear of flange 19 is a notch 20 to serve as a stop means to prevent the links between the sausages from sliding off the back end of the loading device. If the strings of sausages are being loaded in a coil form, as illustrated, the front edge of stand 12 will also cooperate with notch 20 in preventing the sausages from sliding from the holder. Preferably, the holder 11 is slanted upwardly from the end 9 of the holder to which the stand 12 is attached to facilitate the looping of the sausage string about the forwardly end.

For the smoking process the strings of sausages are draped or coiled over the smoke stick. The individual turns of the coils, or the adjacent rows of sausages, are spaced from each other to facilitate access of the smoke to all sides of the sausages. Thus, the sausage strings when arranged on the sticks occupy considerably more space along the stick than is accounted for by the sum of the individual widths of the sausages. This fact allows the length of the holder to be made much shorter than the length of the smoke stick and still permit sufficient coils of sausages to be formed on the holder to fill a smoke stick. The holder may be made longer if desired but, preferably, it is not much longer than actually necessary because an excessive length slows the forming of the coils and the transferring of the formed coils to the stick.

By employing the present invention the smoke sticks may be loaded with remarkable ease and rapidity. One or more strings of sausages are coiled about the holder by the operator. As each turn is put on, it is placed so that the connecting link between a pair of sausages rides on the flange 19. The flange serves as a gauging point from which equally sized loops may be measured by using a given number of sausages for each loop. The inclination of the holder 11 causes each loop as it is put on the slide by gravity to the rear of the holder, the first loop being held in place by notch 20.

After sufficient loops have been placed about the holder to fill the length of the type of smoke stick being used, a smoke stick 18 may be inserted within the internal opening of the holder. The smoke stick may then be moved sideways out the open side of the U, raised to transfer the support of the sausages from the holder to the stick and moved toward the unsupported end of the holder (to the right in Fig. 1) to completely disengage the sausage loops from the holder. The stick is then emplaced on the sausage tree and the individual loops of the string are rearranged to provide the desired spacing between turns.

The present invention not only simplifies the work of placing the sausages on the smoke stick but also enables one person to do substantially as much work as had been done by two with prior methods. In the past, the general procedure has been for one person to twist the filled casings at spaced points along the casing to form the individual sausages. As a string of sausages was formed by this worker, it was placed upon a table, from which table a second person obtained the string of sausages to load a smoke stick.

With the present invention only one person is necessary to both form the sausages and to prepare a load for the smoke stick. This person will take a filled casing and form the individual sausages in the usual manner. After forming approximately four individual sausages, a loop of those sausages is thrown over the holder. After four more are made, they may be quickly thrown about the holder by the worker and, in this manner, the person forming the sausages can prepare a coil for a smoke stick virtually as fast as the sausages can be made. In addition to saving labor, this method reduces the handling involved in the prior two step process.

I claim:

1. A device of the class described for use in loading linked sausages, or the like, on a smoke stick, said device including an elongated holder having a longitudinal opening therein sufficiently large in cross-sectional configuration to receive said stick longitudinally of the holder, the lower side of said opening being closed whereby the stick will be supported in the holder, and support means attached to the holder adjacent one end of the holder to position the holder above a work surface, said elongated holder projecting beyond said support means whereby the sausage string may be hung on the holder and thereafter transferred to a stick inserted within said opening.

2. A device of the class described for use with a smoke stick, said device including a generally U-shaped elongated holder over which linked sausages or the like may be hung and through which a smoke stick may be inserted so that said sausages may be transferred from the holder to the stick, said holder being positioned with one of the closed portions of said U shape at the bottom whereby the stick will be supported therein, and support means attached to the holder adjacent one end of the holder to position the holder above a work surface, said elongated holder projecting beyond said support means.

3. A device adapted to be positioned above a work surface and for use in placing linked sausages or the like on a smoke stick, said device including support means and an elongated holder attached adjacent one end to said support means, said support means being adapted to position said holder above a work surface, with the unsupported end of the holder higher than the end to which the support means is attached, said holder having a generally U-shaped configuration as viewed in a cross section normal to the longitudinal axis of the holder, said holder being attached to said support means with one of the closed portions of said U shape at the bottom whereby the stick will be supported therein, the sausage may be hung over the holder and thereafter a smoke stick may be inserted within the U of the holder to transfer the sausages to the stick.

4. A device adapted to be positioned above a work surface and for use in placing linked sausages or the like on a smoke stick, said device including support means and an elongated U-shaped holder attached adjacent one end to said support means, said support means being adapted to support said elongated holder above a work surface, with the U-shaped internal opening of the holder in substantially a horizontal position, said holder having a flange projecting outwardly from one side of the open end of the U, said holder having a sufficiently large internal opening, as viewed in cross section, to receive said stick and being attached to said support so that the open portion of the U projects to one side with said flange being upwardly whereby the sausages may be hung over the holder with the flange supporting and separating pairs of sausages, and thereafter a stick may be inserted within the U and supported therein while the sausages are transferred to the stick.

5. A device adapted to be positioned above a work surface and for use in placing linked sausages or the like on a smoke stick, said device including support means and an elongated U-shaped holder attached adjacent one end to said support means, said support means being adapted to position said holder above a work surface, with the unsupported end of the elongated holder higher than the end of the elongated holder to which the support means is attached, said holder having a flange projecting outwardly from one side of the open end of the U, said holder having a sufficiently large internal opening, as viewed in cross section, to receive said stick and being attached to said support so that the open portion of the U projects to one side with said flange being upwardly whereby the sausages may be hung over the holder with the flange supporting and separating pairs of sausages, and thereafter a stick may be inserted within the U and supported therein while the sausages are transferred to the stick.

6. A device adapted to be positioned above a work surface and for use in placing linked sausages, or the like, on a smoke stick, said device including support means adapted to position said device above a horizontal surface, an elongated U-shaped holder attached adjacent one end to said support means and inclined upwardly therefrom, and stop means to prevent the sausages hung over the holder from sliding off the lower end of the holder, said holder having a flange projecting outwardly from one side of the opened end of the U, said holder having a sufficiently large internal opening, as viewed in cross section, to receive said stick and being attached to said support so that the opened portion of the U projects to one side with said flange being upwardly whereby the sausages may be hung over the holder with the flange supporting and separating pairs of sausages and, thereafter, a stick may be inserted within the U and supported therein while the sausages are transferred to the stick.

DANIEL JOSEPH McLAUGHLIN.

REFERENCES CITED

The following references are of record in the file of this patent:

UNITED STATES PATENTS

| Number | Name | Date |
| --- | --- | --- |
| 1,182,322 | Salay | May 9, 1916 |
| 2,301,878 | Iwema | Nov. 10, 1942 |